May 25, 1965     R. E. SCHORNSTHEIMER ETAL     3,184,807
GASKET CONTAINING A PERMANENT MAGNET
Filed Nov. 24, 1958

INVENTORS
ROBERT E. SCHORNSTHEIMER
BY THOMAS R. ROHRER

W. A. Shira, Jr.
ATTY.

3,184,807
GASKET CONTAINING A PERMANENT MAGNET
Robert E. Schornstheimer, Marietta, and Thomas R. Rohrer, Marion, Ohio, assignors to The B. F. Goodrich Company, New York, N.Y., a corporation of New York
Filed Nov. 24, 1958, Ser. No. 775,834
6 Claims. (Cl. 20—69)

This invention relates to gaskets containing permanent magnets for use about door openings as, for example, those in refrigerators and similar cabinets.

Refrigerators, especially those of the type used in the home, employ a gasket or sealing means between the door and the body of the cabinet to cushion the door in closing, to prevent the passage of air when the door is closed and provide a heat-insulating barrier in this region. These gaskets are generally formed of rubber, synthetic plastic or other elastomeric material which have rubber-like properties so they can deform under pressure and thereby provide a seal between the cabinet and door even though there be irregularities in the surfaces of these members. Heretofore, it has been customary to form the gasket of a material and in a configuration such that considerable pressure is required to deform the gasket sufficiently to provide effective sealing action around the entire door opening. This has made it necessary to utilize door latches which produce a strong clamping force. In an effort to avoid the need for such latches, attempts have been made to employ door gaskets requiring only a light compressive force to effect conformation to the surfaces engaged, this force being supplied by magnetic means. Although such magnetic door gaskets have many advantages over the conventional combination of latch and stiff gasket, nevertheless, they have not heretofore received wide acceptance. This is partly because the gaskets in some cases have not provided the necessary sealing action but more importantly because the cost of manufacture has been excessive.

The success of a gasket in providing effective sealing action for refrigerators or similar cabinets depends in a large measure upon its ability to deform sufficiently to accommodate to the unavoidable irregularities in the adjacent surfaces of the cabinet and door between which the gasket is placed. It has, therefore, been thought necessary heretofore, when employing magnet-containing gaskets for refrigerators, to provide the magnets in short lengths in order to preserve the required flexibility along the length of the gasket. This has resulted in increased expense because of the difficulties of properly incorporating short length magnets in the gasket. Moreover, the several short lengths of magnets have sometimes tended to by-pass each other within the gasket after installation resulting in improper sealing action and/or damage to the gasket.

In accordance with this invention these and related difficulties are overcome by providing an improved gasket construction containing a permanent magnet in elongated flexible form. The magnet in this form can be readily incorporated in a gasket as a single continuous length for each reach of the gasket disposed about a cabinet opening while permitting flexing of the combined gasket and magnet to accommodate to the adjacent surfaces of the cabinet and door between which the gasket is employed. The flexible permanent magnet, by virtue of its composition and physical nature as hereinafter explained, may be readily and economically manufactured with known equipment and may be magnetized in a manner providing any desired arrangement of magnetic poles.

An object of the invention is, therefore, to provide an improved magnet-containing gasket for use about door openings, for example, the door openings in refrigerators or similar cabinets, which gasket is easier and less expensive to manufacture than prior gaskets provided with magnets.

A further object of the invention is to provide an improved door sealing gasket for a cabinet with a hinged door characterized by the gasket surrounding the cabinet opening and having an elongated chamber therein supported in spaced parallel relationship to the base portion of the gasket by two flexible spaced walls of lesser thickness than the base portion and with the chamber on at least one of the sides of the gasket other than that on the hinge side of the opening provided with an elongated flexible magnet.

Further objects and advantages of this invention will be apparent to those skilled in the art to which it pertains from the following description of the presently preferred embodiment thereof, and certain modifications, described with reference to the accompanying drawing forming a part of this application in which.

Figure 1:
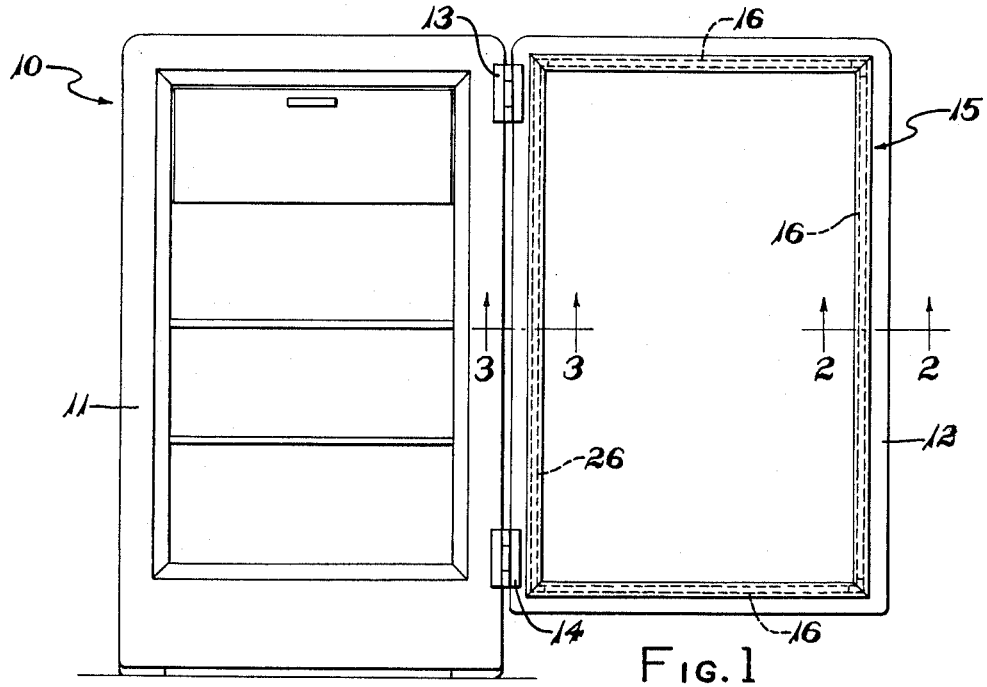
FIG. 1 is a front elevational view of a refrigerator cabinet with the door in open position and showing a gasket provided with permanent magnets in accordance with this invention.

A refrigerator 10 of conventional construction is illustrated in FIG. 1 as comprising a cabinet member 11 providing a storage compartment the opening of which is closable by a door member 12 that is swingably mounted on the cabinet by hinges 13 and 14. The cabinet and door contain magnetically permeable material since the shell of both of these members is formed of sheet iron or steel. The opening to the storage compartment is sealed when the door is closed by a gasket member 15 which is here shown as mounted upon the door 12 in peripherally continuous substantially rectangular configuration with reaches of the gasket extending along each side of the cabinet opening when the door is closed.

In accordance with this invention the gasket 15 performs the dual function of a door seal and a latch. This is achieved by providing one or more of the reaches of the gasket with a permanent magnet 16 which extends as a single continuous length longitudinally of a reach of the gasket. The magnet 16 is provided in strip form and is flexible transversely of its length. The gasket is also formed of flexible material and has a configuration such that a portion thereof can deform when a compressive force is applied, the magnet being so located in the gasket that it is normally spaced from the attached side of the latter by flexible portions or walls of the latter. This insures complete sealing of the space between the cabinet and door when the latter is closed since the magnet holds the gasket to the cabinet and the flexible nature of the gasket and magnet permit them to accommodate to irregularities of the door and cabinet members.

Figure 3:
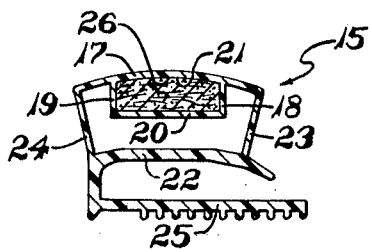
FIG. 3 is a view similar to FIG. 2 but taken substantially on the line 3—3 of FIG. 1 as viewed in the direction indicated by the arrows.
Figure 2:
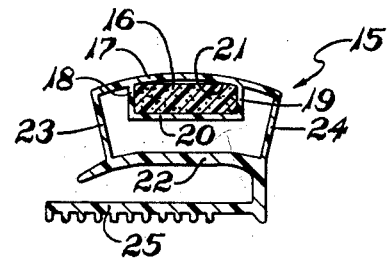
FIG. 2 is a cross section through the magnet-containing gasket detached from the refrigerator, the view being taken substantially on the line 2—2 of FIG. 1 as viewed in the direction indicated by the arrows.
Figure 4:
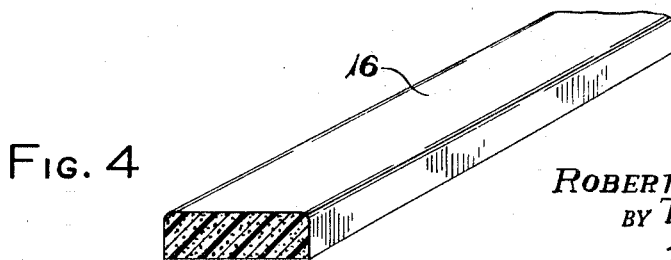
FIG. 4 is a fragmentary perspective view showing a portion of the flexible magnet strip.

The gasket 15 may take a variety of configurations. As here shown, however, this gasket comprises laterally spaced, interconnected, longitudinally extending flexible wall portions 17, 18, 19 and 20 defining a longitudinally extending pocket or compartment 21 for the flexible magnetic strip 16 which pocket or compartment is connected to a longitudinally extending flexible base portion 22 by flexible longitudinally extending members or portions 23 and 24. The base portion 22 is preferably thicker than the wall members or portions 17, 18, 19, 20, 23 and 24 and is intended to engage the surface of the door member to which it is attached, attachment being effected by conventional means, not shown, which engage an integral attaching strip portion 25 of the gasket. The attaching strip portion 25 is preferably united with the base member or portion 22 in spaced relationship thereto, as will be apparent from FIGS. 2 and 3, the entire gasket including the attaching portion being preferably formed by extrusion from suitable elastomeric material as, for example, plasticized polyvinyl chloride.

In the illustrated embodiment, the members or portions 23 and 24 of the gasket are shown as of equal dimensions and having the edge regions thereof opposite the base member or portion 22, deflected laterally to form with the wall portion 17 the outer wall of the gasket which contacts the cabinet when the door is closed. There is thus provided a longitudinally extending hollow body with the pocket or compartment 21 contained therein extending parallel to the base portion 22. However, the members or portions 23 and 24 may be connected to the walls of pocket 21 at other locations if desired, the function of the members 23 and 24 being that of providing a flexible and resilient support for the magnet-containing pocket or compartment upon the base portion so that the former can have limited movement relative to the latter when the door is opened and closed.

The magnet member 16 comprises finely-divided magnetic material united by a binder which is a plasticized thermoplastic resin. Preferably, the magnetic material is a ferrite and the resin is a plasticized vinyl resin. The following is a typical example of one suitable composition, the several materials being expressed in terms of parts by weight based upon 100 parts of the resin and also as a percentage of the total weight of the material:

| Material | Parts by weight | Percentage of total weight |
|---|---|---|
| Polyvinyl chloride | 100 | 5.71 |
| Dioctyl phthalate | 82 | 4.69 |
| Barium ferrite powder | 1,560 | 89.19 |
| Barium cadmium laurate | 2.34 | .13 |
| Triphenyl phosphate | 1.26 | .07 |
| Low molecular weight polyethylene | 3.64 | .21 |
| | 1,749.24 | 100.00 |

The barium ferrite powder is in finely-divided condition such that the particle sizes are in the order of a few microns, preferably in the range of 3 to 4 microns. One way in which the proper particle size may be determined readily is by providing the ferrite in sufficient fineness that it all passes through a U.S. Standard Screen of 325 mesh. The dioctyl phthalate is a plasticizer for the polyvinyl chloride, the barium cadmium laurate and the triphenyl phosphate are provided as stabilizers for the polyvinyl chloride, and the polyethylene of low molecular weight serves as a lubricant during the extrusion of the material to form the elongated strip.

In preparing the magnet 16 the above-identified ingredients are tumbled in a suitable container to mix them and thereafter the mixture is placed on a mill of the type used for milling rubber. The rolls of the mill are heated to an appropriate temperature so that the mixture reaches a temperature of approximately 280° F. and is milled for approximately 20 minutes when the size of the batch is in the order of 100 pounds. This operation produces a flexible sheet of the material which is then granulated and fed to an extruding machine having a suitable die to provide the extruded material with the desired cross-sectional dimensions. The material issues from the extruder in an elongated continuous strip and may be coiled because of its flexible nature. The magnetic material may be magnetized by conventional equipment to produce magnetic poles in selected configurations either before it is cut to length or this magnetizing operation may be effected just prior to incorporation of the magnet in a gasket.

An alternative mode of preparing the magnetic material 16 is to form a pre-mix of all the ingredients except the ferrite and put this pre-mix upon a mill with the barium ferrite being added upon the mill when the other ingredients have reached a plastic condition and adhere together. A still different mode of preparing the material is to make a master batch of all the ingredients except the barium ferrite in a Banbury mixer, commonly employed for rubber compounding, and then add the barium ferrite to the master batch with subsequent milling for further mixing. Other modes of handling the material will be readily apparent to those familiar with the art of preparing elastomeric or thermoplastic containing materials, the procedure being selected to produce thorough mixing of the ingredients so that, theoretically, each particle of ferrite is covered by the thermoplastic resin.

The proportions of the ingredients may be altered and other known plasticizers and stabilizers may be employed without loss of the desired magnetic strength and flexibility in the composition. For example, another suitable composition comprises the following:

| Material | Parts by weight | Percentage of total weight |
|---|---|---|
| Polyvinyl chloride | 100 | 6.40 |
| Dioctyl phthalate | 80.9 | 5.17 |
| Lead carbonate paste | 6.10 | 0.39 |
| Low molecular weight polyethylene | 3.64 | 0.23 |
| Lead stearate paste | 1.7 | 0.11 |
| Barium ferrite powder | 1,371.4 | 87.70 |
| | 1,563.74 | 100.00 |

A further specific example of a suitable composition is:

| Material | Parts by weight | Percentage of total weight |
|---|---|---|
| Polyvinyl chloride | 100 | 5.76 |
| Dioctyl phthalate | 80.9 | 4.66 |
| Lead carbonate paste | 10.0 | 0.58 |
| Lead stearate paste | 1.7 | 0.10 |
| Paraffin wax | 5.0 | 0.29 |
| Barium ferrite powder | 1,536.0 | 88.50 |
| Butylated hydroxy toluene | 2.0 | .11 |
| | 1,735.6 | 100.00 |

In this example, the paraffin wax is employed in place of polyethylene as a lubricant for the extrusion operation. In addition, it aids in reducing heat build-up on the mill during the mixing operation. The butylated hydroxy toluene serves as an antioxidant to prevent breakdown of the dioctyl phthalate.

The proportion of the magnetic particles to the thermoplastic resin may be varied by providing the ferrite within the range of 85% to 93% the total weight with corresponding alteration in the other ingredients to provide magnetic material of suitable characteristics for use in refrigerator gaskets. Within this range of variation the ingredients other than the ferrite may be provided as a master batch or mixture based upon any of the above or equivalent formulations and a suitable amount of this master batch is used with the appropriate amount of ferrite to produce the aforementioned percentage of ferrite in the final composition. This eliminates the need for recomputing the individual amounts of each of the separate components when the amount of ferrite is altered within the range stated.

The magnetic material prepared as described above is preferably extruded as a continuous strip of rectangular cross section with the width of the strip being in the range of one-fourth to one-half inch and with the cross sectional area of the strip being .04 to 0.8 square inch for gaskets of the size commonly employed in domestic refrigerators. Such strips, when magnetized, will produce sufficient magnetic attraction for the metal shell of the refrigerator to adequately hold the door in sealed position while permitting the door to be opened with a pull thereon which is in the order of ten pounds or less. The magnetic material in strip form may be readily inserted in the pocket or compartment of the gasket by slipping the strip therein with the strip cut or broken to a length corresponding substantially to the length of one reach of the completed gasket. Separate lengths of gasket material for the separate reaches of the cabinet may thus be prepared and united together at the corners by known sealing operations, such as dielectric heating or the like. To facilitate retaining the gasket material in proper shape during this operation, the pockets or compartments immediately adjacent the corners of the completed gasket may be filled with glass wool or other material, it not being necessary that the magnetic strip extend completely to the corners of the gasket.

All four sides of the completed gasket may be provided with magnetic strips in the manner just described. However, it has been found that, with certain types of hinges now employed on refrigerator cabinets, it is desirable that the reach of the gasket adjacent the hinges not be provided with a magnetic strip. This reach of the gasket may therefore have the pocket or compartment 21 filled with glass wool or other readily deformable resilient material as is indicated at 26 in FIGS. 1 and 3 of the drawing. Also, in some instances it is sufficient to have only the vertical reach of the gasket opposite the hinge side of the door provided with magnetic material in which event the upper end lower reaches of the gasket as well as the reach adjacent the hinges may be supplied with glass wool or the like.

The arrangement of the magnetic poles for the magnetic material 16 may be selected to provide the desired holding action of the magnet. One suitable arrangement is that in which continuous north and south poles are provided running respectively adjacent the longitudinal edges of the strip 16 with the magnetizing force supplied to the strip so that the maximum energy imparted in the magnetizing operation is on that surface of the magnet which will be outermost when placed in the gasket. Other arrangements of magnetic poles may be provided as for example, a plurality of poles alternating across the width of the magnet or lengthwise of the magnet. In other instances, it may be desirable to have a plurality of magnetic poles arranged with those of like polarity adjacent each other. These several arrangements of magnetic poles can be readily effected because of the nature of the magnetic material which does not exhibit the properties of a steel bar when magnetized but instead permits local magnetization to be effected in accordance with any desired pattern.

Thermoplastic resins other than polyvinyl chloride may be employed in forming the magnets as, for example, a copolymer of vinyl chloride with other monomers such as vinyl acetate, vinylidene chloride, methyl acrylate and similar materials. Likewise, ferrites other than barium ferrite may be utilized. It will also be apparent that, when employing a flexible magnet in a gasket, the shape of the gasket and of the magnetic strip may be altered from that illustrated and described so long as the gasket comprises a compartment for the magnetic strip and flexible connecting portions between it and the base of the gasket so that the spacing between the magnetic strip and gasket base can vary when the refrigerator door is opened and closed. The invention is therefore not to be considered as limited to the shapes and compositions shown and specifically described since the above and other variations and modifications will be readily apparent to those skilled in the art.

Having thus described the invention, we claim:

1. A peripherally continuous gasket for an opening in a wall member that is adapted to be closed by a hinged door member, the said gasket comprising an elongated base portion, integral attaching means on said base portion for mounting the gasket upon one of said members so as to extend parallel therewith in interconnected reaches on all sides of said opening, flexible walls defining an elongated hollow chamber, a pair of flexible walls of lesser thickness than said base portion interconnecting the latter to said walls defining the hollow chamber to resiliently support the latter in spaced parallel relationship to said base portion, and an elongated flexible permanent magnet in said chamber of at least one of the reaches other than that on the hinge side of the opening and extending as a single continuous piece substantially the length of the reach in which the magnet is located, the said magnet comprising finely-divided particles of permanent magnetic material united by a flexible binder with the particles of magnetic material comprising at least 87% by weight of the magnet and with the latter having a substantially planar surface on the side thereof adjacent said other member, said magnet being magnetized to provide the said substantially planar surface thereof with at least a pair of magnetic poles of opposite polarity.

2. A gasket as defined in claim 1 wherein the hollow chamber of the reach of the gasket on the hinge side of the opening is filled with a deformable non-magnetic material.

3. A cabinet member having an entrance opening and a hinged door member for closing the opening, at least one of said members having magnetically permeable material adjacent said opening, a sealing gasket mounted on one of said members in a position peripherally of the opening on all sides thereof and engaging the magnetically permeable material of the other member when the door is closed, the said gasket comprising an elongated base portion, integral attaching means on said base portion mounting the gasket upon one of said members so as to extend parallel therewith, flexible walls defining an elongated hollow chamber, a pair of flexible walls of lesser thickness than said base portion interconnecting the latter to said walls defining the hollow chamber to resiliently support the latter in spaced parallel relationship to said base portion, and an elongated flexible permanent magnet in the portion of said chamber adjacent at least one side of said opening other than the hinge side with the magnet extending as a single continuous piece substantially the length of the adjacent side of the opening, the said magnet comprising finely-divided particles of barium ferrite united by a flexible binder with the barium ferrite comprising at least 87% of the total weight of the magnet and with the magnet having a substantially planar surface on the side thereof adjacent said other member, said magnet being magnetized to provide the said substantially planar surface thereof with at least a pair of magnetic poles of opposite polarity.

4. The combination as defined in claim 3 wherein the said hollow chamber of the gasket on the hinge side of the opening is filled with a deformable non-magnetic material.

5. A cabinet member having a substantially rectangular opening with magnetically permeable material adjacent said opening, a door hinged to said cabinet at one side of said opening for closing the latter, a sealing gasket mounted on said door in four interconnected reaches extending peripherally of said opening when the door is closed, the said gasket comprising an elongated base portion, integral attaching means on said base portion mounting the gasket upon said door so as to extend parallel therewith, flexible walls defining an elongated hollow chamber, a pair of flexible walls of equal dimensions interconnecting the base portion to said walls defining the hollow chamber, the said pair of walls being of lesser thickness than the base portion and resiliently supporting the chamber in spaced parallel relationship to said base portion, deformable non-magnetic material in the reach of said chamber on the hinge side of the opening, and an elongated flexible permanent magnet in said chamber on each of the reaches on the other three sides of the opening, the magnet in each of said other reaches extending as a single continuous piece substantially the length of that reach, the said magnet comprising finely-divided particles of permanent magnetic material united by a flexible binder with a substantially planar surface on the side of the magnet adjacent said other member, said magnet being magnetized to provide the said substantially planar surface thereof with at least a pair of magnetic poles of opposite polarity.

6. The combination as defined in claim 5 wherein the said finely-divided particles of permanent magnetic material are barium ferrite particles of size such that all pass through a U.S. standard screen of 325 mesh with the particles comprising at least 87% of the weight of the magnet.

References Cited by the Examiner

UNITED STATES PATENTS

| | | | |
|---|---|---|---|
| 2,446,336 | 8/48 | Mark et al. | 20—69 |
| 2,589,766 | 3/52 | Bernstein | 20—69 X |
| 2,603,843 | 7/52 | Hill | 20—69 |
| 2,627,097 | 2/53 | Ellis | 20—69 X |
| 2,655,195 | 10/53 | Curtis | 252—62.5 X |
| 2,659,114 | 11/53 | Anderson et al. | 20—69 |
| 2,659,118 | 11/53 | Anderson et al. | 20—69 |
| 2,723,896 | 11/53 | Wurtz | 20—69 X |
| 2,762,778 | 9/56 | Gorter et al. | 252—62.5 |
| 2,807,841 | 10/57 | Janos | 20—69 |
| 2,859,495 | 11/58 | Roberts | 20—35 X |
| 2,959,832 | 11/60 | Baermann | 20—69 X |
| 2,999,275 | 9/61 | Blume | 252—62.5 X |
| 3,036,008 | 5/62 | Berge | 252—62.5 |

FOREIGN PATENTS

| | | |
|---|---|---|
| 708,127 | 4/54 | Great Britain. |
| 758,320 | 10/56 | Great Britain. |

HARRISON R. MOSELEY, *Primary Examiner.*

GEORGE A. NINAS, JR., ABRAHAM G. STONE, *Examiners.*